United States Patent [19]

Hutchinson

[11] 4,102,330
[45] Jul. 25, 1978

[54] LIQUID VAT HEATING APPARATUS

[76] Inventor: Donald D. Hutchinson, 229 Montreal, Playa del Rey, Calif. 90291

[21] Appl. No.: 836,294

[22] Filed: Sep. 26, 1977

Related U.S. Application Data

[63] Continuation of Ser. No. 685,693, May 12, 1976, abandoned.

[51] Int. Cl.² ............................................. A47J 27/00
[52] U.S. Cl. ..................................... 126/374; 126/351; 99/331; 236/20 R
[58] Field of Search .................. 126/374, 351; 99/331; 236/20 R, 11

[56] References Cited

U.S. PATENT DOCUMENTS

| | | | |
|---|---|---|---|
| 1,270,877 | 7/1918 | Schulz | 236/11 |
| 3,887,325 | 6/1975 | Finger et al. | 126/351 |
| 3,960,137 | 6/1976 | Schmid | 126/351 |
| 3,977,390 | 8/1976 | Fogel et al. | 126/374 |

Primary Examiner—John J. Camby
Assistant Examiner—Larry I. Schwartz
Attorney, Agent, or Firm—Gene W. Arant; J. B. McGuire

[57] ABSTRACT

Food products are cooked by immersing them in a body of hot liquid contained in a vat, and in order to maintain the liquid at a temperature level suitable for cooking purposes a gas burner underneath the vat is turned on periodically. Gas consumption is conserved, each time the gas burner is turned off, by interrupting the air passageway associated with the burner, to prevent cold air from flowing through the passageway and hence drawing off the heat energy that was previously stored in the body of hot liquid.

6 Claims, 8 Drawing Figures

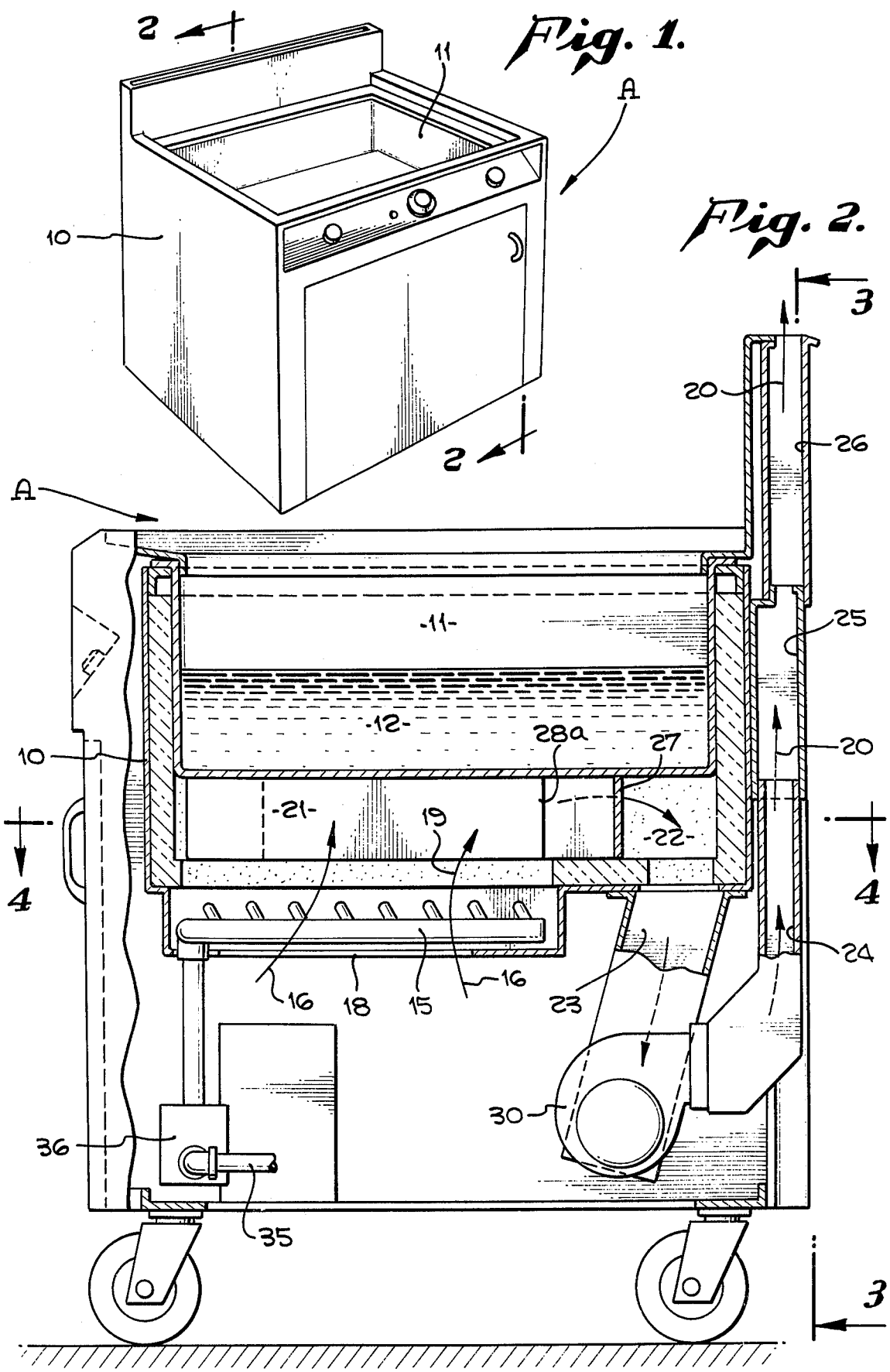

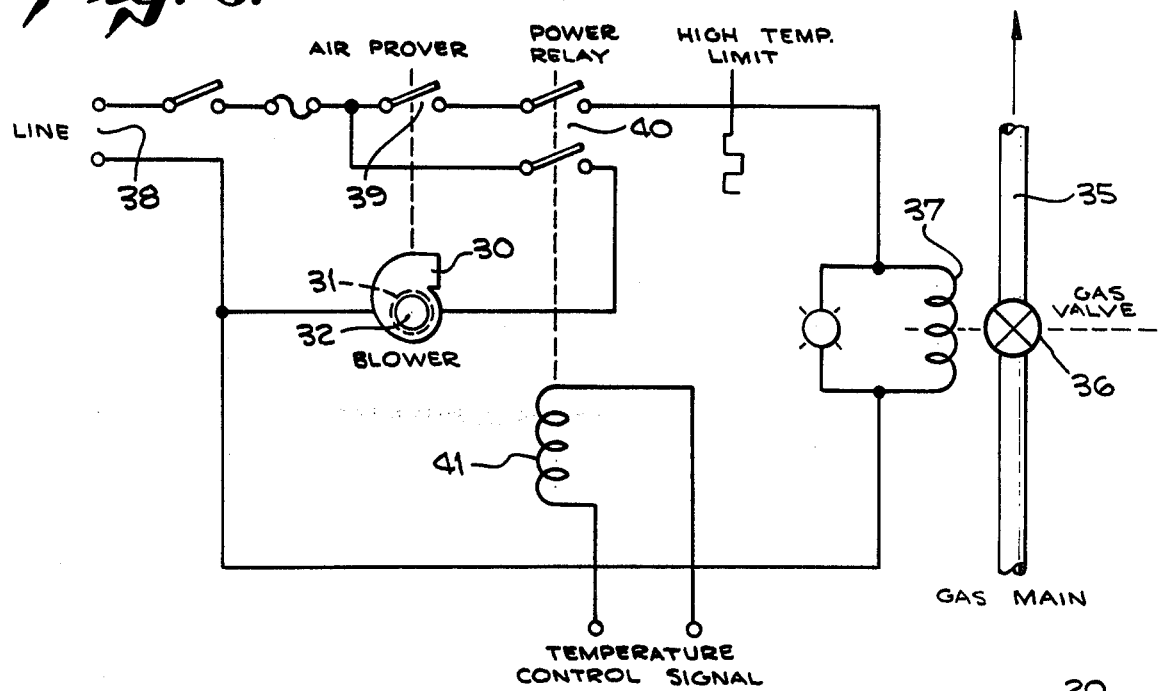
Fig. 6.
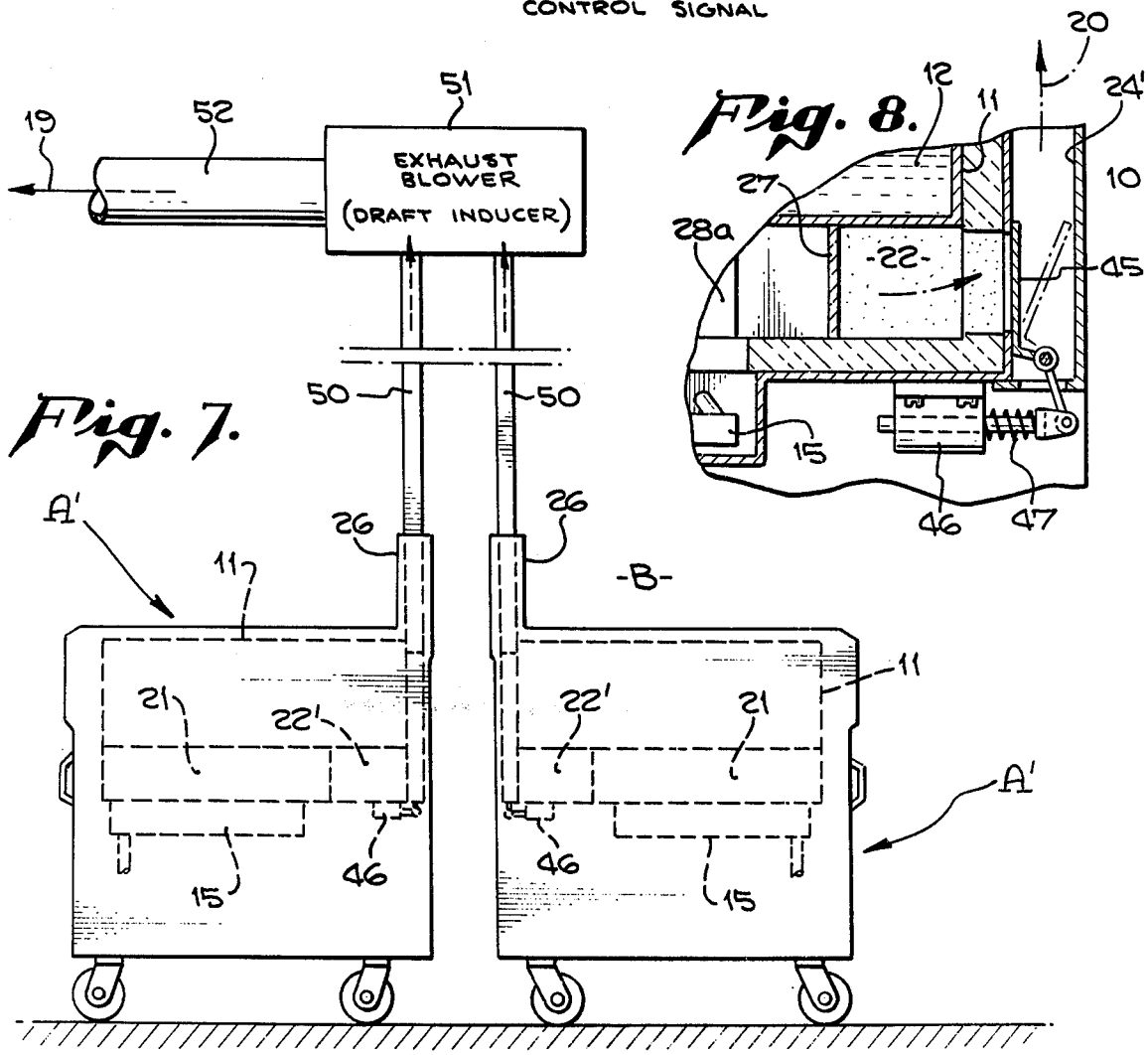
Fig. 7.
Fig. 8.

LIQUID VAT HEATING APPARATUS

This is a continuation, of application Ser. No. 685,693, filed May 12, 1976, and now abandoned.

BACKGROUND OF THE INVENTION

Cooking units of the liquid vat type are commonly used in restaurants for cooking french fries and the like. A body of hot oil or other liquid is maintained at a temperature level suitable for cooking purposes, and food products to be cooked are immersed therein for the requisite length of time.

Such cooking units are typically designed to receive their cooking energy from natural gas. A gas burner is placed underneath the vat. An air inlet conveys fresh, combustible air through a confined pasageway to the burner, and after combustion the heated air and combustion products of the gas flow through an exhaust passageway which is in thermal communication with the vat, thereby heating the vat and its liquid contents.

In cooking units of this type, as in other gas appliances, the gas burner is turned on to burn at full force and then, after a requisite amount of heat has been generated, it is turned off. Eventually the temperature of the liquid body drops below a control level, and then the burner is turned on again.

Cooking units of the type referred to have provided very satisfactory service, particularly in the fast food type of restaurant. Nevertheless, it is the purpose of te present invention to provide an improved form of such cooking apparatus, as well as a method of using same, for the specific purpose of conserving the energy supply.

SUMMARY OF THE INVENTION

The present invention is based upon my discovery that cooking units of the type referred to above, while designed for their heating capability, also have a cooling or refrigerating capability which is undesirable and wasteful. In particular, the gas burner must have an air passgeway associated with it which draws in the fresh, combustible air which is generally at a relatively cold temperature level. When the fresh air reaches the burner combustion occurs, and the heated air and combustion products then flow through a further extension of the same passageway which is deliberately placed in efficient thermal communication with the liquid vat, so that heat energy from the air and combustion products may be transferred to the vat and its contents. Each time the gas burner is turned on it is permitted to burn long enough to raise the temperature of the body of liquid in the vat to a control level, and then the burner is turned off in order to avoid overheating the vat and also in order to save fuel.

I have observed, however, that when the gas burner is turned off the air passageway that was designed for heating purposes effectively becomes a cooling or refrigerating means. The combustion chamber or exhaust passageway of the cooking appliance is necessarily provided with a flu or stack of some vertical length. This flu or stack creates a draft which continues to draw cold air in through the air inlet even after the gas burner is turned off. The cold air flowing through the combustion chamber or exhaust passageway is necessarily in good thermal communication with the vat (the same as would have been if it had been heated air) and it therefore tends to draw off some of the heat which was previously stored in the liquid contents of the vat.

According to my invention a very simple solution is provided for this problem. I simply use the same control means that turns off the gas burner to also close off, or at least interrupt, the air passageway. The inflow of cold air toward the gas burner is therefore stopped.

An additional feature of my invention is that I prefer to interrupt or close off the air passageway on the exhaust or outlet side of the combustion chamber or exhaust passageway. The result then is that some of the heated air and combustion products, which would otherwise have escaped through the flu or stack, are held underneath the vat until their heat energy has been effectively transferred into the liquid contents of the vat. More specifically, an outlet portion may be provided in which the exhaust passageway first extends downwardly to an elevation lower than that of the burner air inlet and is then reversed in direction to extend upwardly, alongside the vat if desired. A blower may also be placed in the exhaust passageway near its lowest point. Preferably, the blower fan may be controlled such that it is turned off whenever gas to the burner is shut off.

DRAWING SUMMARY

FIG. 1 is a perspective view of the presently preferred cooking unit in accordance with the invention;

FIG. 2 is a cross-sectional elevational view taken on the line 2—2 of FIG. 1;

FIG. 6 is a schematic diagram of the electrical control system of the cooking unit of FIG. 1;

FIG. 7 is a schematic drawing, partially in dotted lines, of an alternate type of cooking installation in accordance with the present invention; and FIG. 8 is an enlarged fragmentary cross-sectional view showing the damper mechanism of one of the cooking units of FIG. 7.

Figure 3:
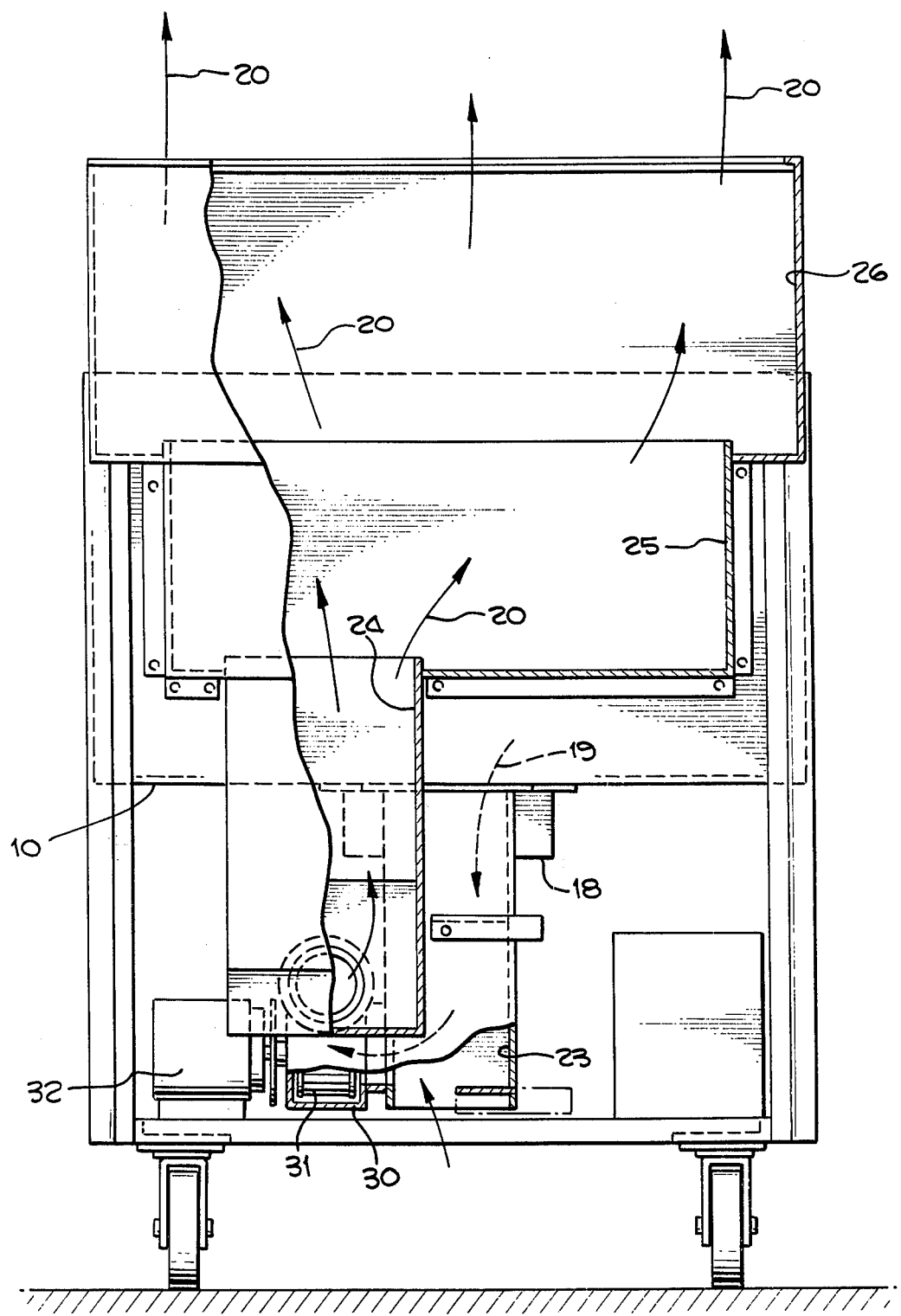
FIG. 3 is an elevational view, partially in cross-section, taken on line 3—3 of FIG. 2.

PREFERRED EMBODIMENT (Cooking Unit of FIGS. 1-6)

Reference is now made to FIGS. 1-6 of the drawings illustrating the presently preferred cooking unit in accordance with the invention.

A cooking unit generally designated as A has a mobile housing 10 within the upper portion of which is supported an open vat or tank 11. A liquid body 12 is contained in the vat (FIG. 2) being typically cooking oil.

Beneath the underside of the vat 11 is supported a gas burner 15 of the type adapted to burn natural gas. A housing portion which is illustrated as being located at least partially beneath vat 11 encloses burner 15 and may be left open on its underside to provide an air inlet 18. As can be seen in FIG. 2, the inlet 18 may be located at an elevation below the elevation of the burner 15 which, for these purposes, may be considered to be the upper surface of the burner, i.e., approximately the lowest plane in which combustion can occur if the gas burner apertures are in the upper surface of the burner. When the gas burner is on, fresh and relatively cold combustible air indicated by arrows 16 flows inward through the air inlet 18, upward towards and through the burner 15, and into combustion chamber 21 where combustion takes place. The heated air and combustion products 19 then flow horizontally through a baffle arrangement (FIG. 5) into a chamber extension 22. While occupying combustion chamber 21, or flowing through the baffle arrangement into chamber extension 22, the heated air and combustion products are in effective thermal communication with vat 11, because they flow directly upon the undersurface of the bottom wall of the vat. Thus, heat energy is effectively transferred from the heated air and combustion products 19 into the vat 11 and liquid body 12.

From chamber extension 22 a first portion 23 of an exhaust passageway extends downwardly. As can be seen in FIG. 2, for example, the first portion 23 of the exhaust passageway extends to an elevation below the elevation of the burner 15 as previously described, as well as below the elevation of the combustion intake 18. A blower housing 30 contains a blower fan 31 of the squirrel cage type, which is drivingly rotated by blower motor 32. The lower end of the first exhaust passageway, portion 23 communicates with blower housing 30, at the radial center or inlet portion of the squirrel cage, and hence the blower housing becomes a portion of the exhaust passageway. The outward portion of blower housing 30 is coupled to the lower end of an upwardly extending exhaust passageway second portion 24. Additional exhaust passageway portions 25, 26 extend above the exhaust passageway 24 and hence form somewhat of a flu or stack as an integral portion of the cooking unit A. The heated air and combustion products which have passed through the blower and then escape upwardly through the exhaust passageway portions concluding with passageway portion 26 are designated by an arrow 20.

It will be noted that some type of exhaust means may be required above the vat 11, in order to draw cooking fumes away from the surface of liquid body 12. The exhaust means used for that purpose would not necessarily have any relationship to the exhaust passageway and the blower 31 used for exhausting combustion products, and hence is not illustrated in the present drawings.

Figure 5:
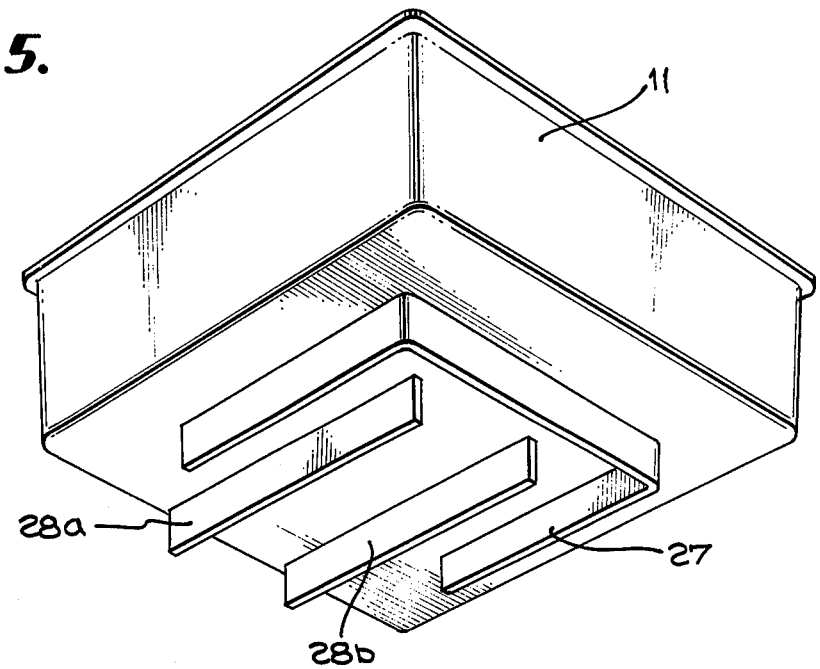
FIG. 5 is a perspective view of the underside of the vat.
Figure 4:
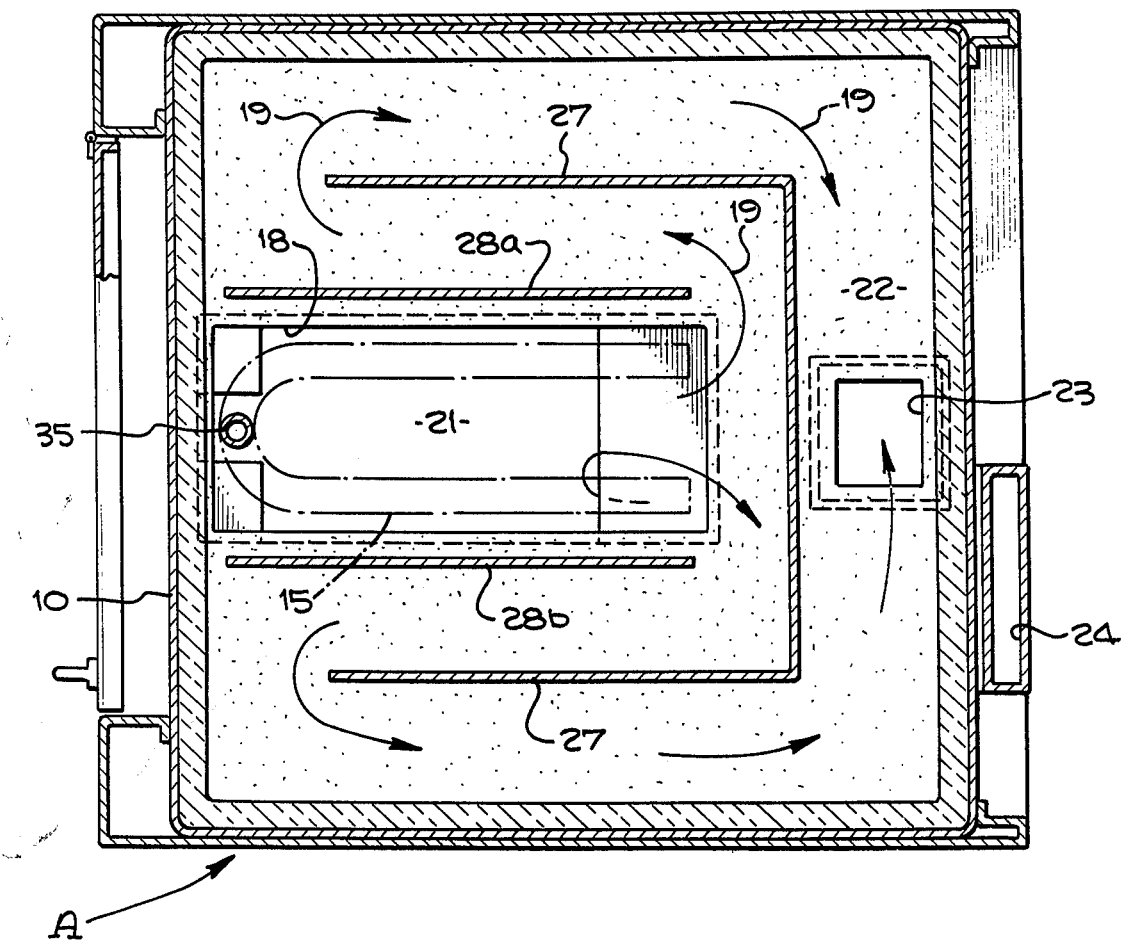
FIG. 4 is a horizontal cross-sectional view taken on line 4—4 of FIG. 2.

FIG. 5 illustrates the baffle arrangement referred to above. A long metal strap 27 is bent into a U-shaped configuration and welded to the undersurface of the vat 11. A pair of shorter straps 28a, 28b are placed within the strap 27, parallel to its sides, and also welded to the vat. The ends of straps 28a, 28b are spaced some distance away from the end of strap 27 (the bottom of the U) so as to provide an air passageway therebetween. Arrows 19 in FIG. 4 illustrate the dual pathways of heated air and combustion products 19, as they flow upwardly from the gas burner 15 into combustion chamber 21 and hence along the horizontal pathways provided by the baffles into chamber extension 22, and then downwardly into exhaust passageway 23.

CONTROL CIRCUIT

The control circuit for cooking unit A of FIG. 1 is illustrated in FIG. 6. Alternating line voltage from a source 38 flows in a series loop through a gas valve solenoid 37, an air prover relay 39, and a power relay 40. The air prover relay 39 is a safety device which protects against a blower failure. The air prover relay 39 includes an air flap or switch which is normally kept closed by the air stream generated from the blower. If the blower fails, the air stream stops and then the switch opens and prevents further power from flowing either through gas valve solenoid 37 of the power relay 40. Gas valve remains open when its control solenoid 37 is energized, but when current flow through the solenoid is discontinued the gas valve 36 will be shut off. When energizing current through power relay 40 stops, the relay opens and shuts off current flow to the blower.

A specific feature of the circuit of FIG. 6 is coil 41 which receives a temperature control signal that is obtained (by means not shown) by measuring temperature of liquid body 12. Control coil 41 is coupled to power relay 40. When the temperature of liquid body 12 drops below its prescribed control level, a signal generated from the control coil 41 causes power relay 40 to close. Solenoid coil 37 is then energized and causes the gas valve 36 to open and turn on, and at the same time the blower motor 32 is energized for starting the blower 31.

When the temperature of liquid body 12 reaches its control level, the necessary control signal on coil 41 is removed. Power relay 40 then opens, de-energizing both the gas valve solenoid 37 and the blower motor 32, hence causing both gas valve 36 and blower motor 32 to shut off.

METHOD OF OPERATION

The novel method of operation of the invention will now be described with reference to FIGS. 1–6. When gas valve 36 is open or on the burner 15 is on, and heated air and combustion products flow in the manner illustrated in FIGS. 2, 3 and 4. Blower motor 32 and blower fan 31 are also operating. Not only does the blower drive the flu or stack for purposes of exhausting combustion products from the appliance, but it also draws a strong draft through the gas burner 15, thus producing a maximum burning rate and a maximum generation of heat in the combustion chamber.

When the gas burner shuts off, however, the operation is entirely different. Blower fan 30 shuts off at the same time, at least partially interrupting the air passageway which is available for exhausting the contents of the combustion chamber into the flu or stack and hence into the atmosphere of the room or space in which the cooking unit is contained.

The stopping of the blower concurrent with the turning off of the burner has two significant effects. First, whatever heated air and combustion products 19 are contained in the combustion chamber 21 and chamber extension 22 are captured, and after some period of time their heat content is fully transferred into the vat 11 and its liquid body 12. More importantly, however, the inflow or cold fresh air through the air inlet 18 is stopped. Hence, the cooling or refrigerating effect which such cold air could have upon the vat 11 and its liquid contents 12, by flowing through combustion chamber 21 and chamber extension 22, is effectively prevented.

The stopping of the squirrel cage blower fan 31, as previously mentioned, at least partially interrupts the air passageway of the appliance. But even if the blower fan was never present in the air passageway, the air flow and exhaust movements would be substantially halted when the gas burner is turned off. The reason is that the heated air and combustion products contained in the combustion chamber 21 and chamber extension 22 are lighter than the cold air beneath the air inlet 18. The hot air tends to flow upward rather than downward. It will be noted that exhaust passageway 23–24 extends downward from the chamber extension 22, and hence serves as a trap into which the hot air and exhaust products will not readily flow. This is particularly true because the exhaust passageway first portion 23 extends downward to an elevation significantly lower than the elevation of the air inlet 18.

ALTERNATE FORM

Reference is now made to FIGS. 7 and 8 illustrating an alternate form of the invention. A cooking installation B includes a pair of identical cooking units A'. Each cooking unit A' includes a vat 11, a gas burner 15, and a combustion chamber 21, which are identical to those of the cooking units A. Cooking unit A' also includes a combustion chamber extension 22' which is nearly identical to the corresponding portion of cooking unit A.

In the cooking installation of FIG. 7 each cooking unit A' is fitted with an exhaust pipe 50 which extends upward a substantial distance from exhaust passageway 26, and may for example extend near to or beyond the ceiling of a room in which the equipment is located. Both of the exhaust pipes 50 are coupled into a single exhaust blower 51 whose output then passes through a flu 52. In the operation of this equipment the exhaust blower 51 is kept operating at all times, regardless of whether either or both of the gas burners of the cooking units are turned on.

The significant modification of cooking unit A' is shown in FIG. 8. Combustion chamber extension 22' is in direct horizontal communication with exhaust passageway 24'. Neither of these spaces extends downwardly beneath the level of the combustion chamber. A damper 45 is pivotally mounted within the lower portion of exhaust passageway 24', and normally closes the opening through which chamber extension 22' communicates with exhaust passageway 24'.

A control solenoid 46 is mounted external to and underneath the combustion chamber housing, and coupled to the damper 45 for selectively opening the same. The plunger of solenoid 46 is provided with a return spring 47 which normally maintains damper 45 in its closed position. When solenoid 46 is energized, however, the solenoid plunger overcomes the force of spring 47 and opens the damper The control circuit for cooking unit A' is the same as shown in FIG. 6, except that the air prover relay 39 is not present, and solenoid 46 is substituted in place of blower motor 32. Thus, when line energy from source 38 is applied to the circuit, solenoid 37 opens the gas valve 36 while solenoid 46 opens the damper 45.

When the temperature of the liquid body in vat 11 reaches its prescribed control level, a signal appears in control winding 41 and power relay 40 opens. The loss of energy to solenoid 37 causes gas valve 36 to close, shutting off burner 15. At the same time the loss of energy to solenoid 46 causes the damper 45 to close. It will therefore be seen that the method of operation of the embodiment of FIGS. 7 and 8 is nearly identical to that of the first embodiment. The necessary draft for the gas burners is induced by the blower 51 from a relatively remote location, rather than from a blower contained within each individual cooking unit. When each gas burner is turned off, the associated damper is closed, causing heated air and combustion products to be captured within the combustion chamber in the same manner as in the operation of the first embodiment of the invention. At the same time the closing of the damper prevents cold air from coming in through the air inlet 18 and hence prevents cold air from having a cooling or refrigerating effect upon the liquid contents of the vat.

The invention has been described in considerable detail in order to comply with the patent laws by providing a full public disclosure of at least one of its forms. However, such detailed description is not intended in any way to limit the broad features or principles of the invention, or the scope of the patent monopoly to be granted.

What is claimed is:

1. A heating apparatus including
a vat filled with liquid that is to be heated;
a combustion chamber including a housing disposed at least partially beneath the vat in thermal communication therewith;
a gas burner disposed within the combustion chamber;
the chamber housing having air inlet means cooperating with and below the elevation of the burner for supplying fresh air thereto and an exhaust passageway coupled to the combustion chamber for conducting therefrom substantially all of the heated air and combustion products generated by the burner;
and means for selectively turning the burner on and off;
said exhaust passageway including a first portion in direct communication with and extending downwardly from said combustion chamber to an elevation lower than the lowest elevation of said chamber, and a second portion if direct communication with said first portion at said lowest elevation thereof below said chamber and extending upwardly to an elevation higher than said gas burner;
a blower fan operatively connected to said combustion chamber and operable for moving the heated air and combustion products in said combustion chamber through said exhaust passageway; and
control means coupled to said burner and to said blower fan and cooperable with said selective on-off means for turning off said blower fan whenever said gas burner is turned off.

2. Liquid vat heating apparatus as claimed in claim 1 wherein said first outlet portion of said exhaust passageway extends downward to an elevation that is lower than the elevation of said air inlet means.

3. Liquid vat heating apparatus as claimed in claim 2 wherein said blower fan is positioned within said exhaust passageway at an elevation below that of said air inlet means.

4. Liquid vat heating apparatus as claimed in claim 1 wherein said control means includes means for turning on said blower fan whenever combustion occurs at said gas burner.

5. Liquid vat heating apparatus as claimed in claim 1 which further includes a plurality of baffles disposed within the combustion chamber and operable for limiting movement of the heated air and combustion products through a circuitous horizontal pathway before movement of such products through said downwardly extending first portion of said exhaust passageway.

6. Liquid vat heating apparatus as claimed in claim 1 wherein the cross-sectional area of said first portion of said exhaust passageway is smaller than the cross-sectional area of the pathway along which the heated air and combustion products flow within the combustion chamber, and wherein said blower fan is positioned within said first portion of said exhaust passageway.

* * * * *